Figure 4:
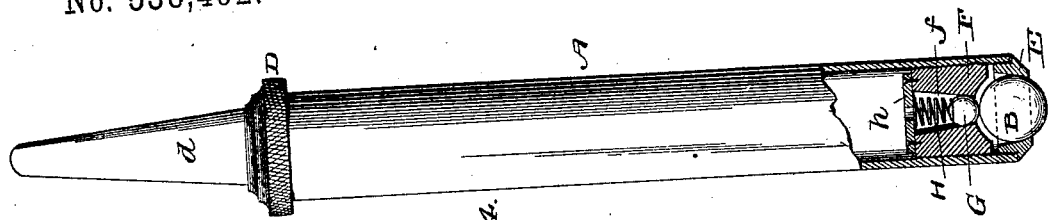
Figure 5:
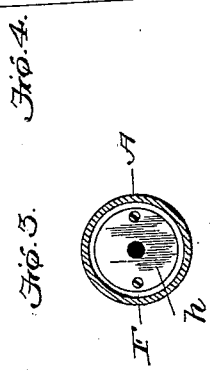
Figure 2:
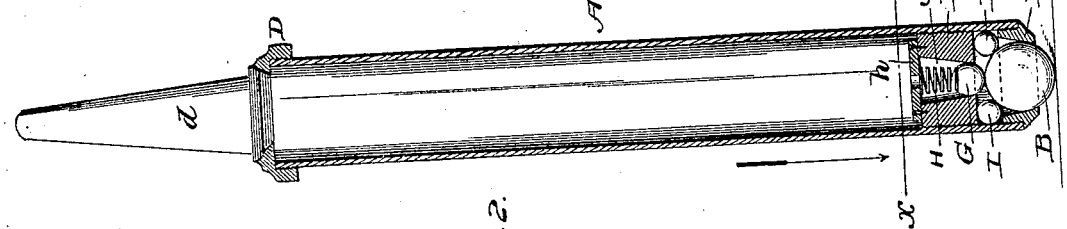
Figure 1:
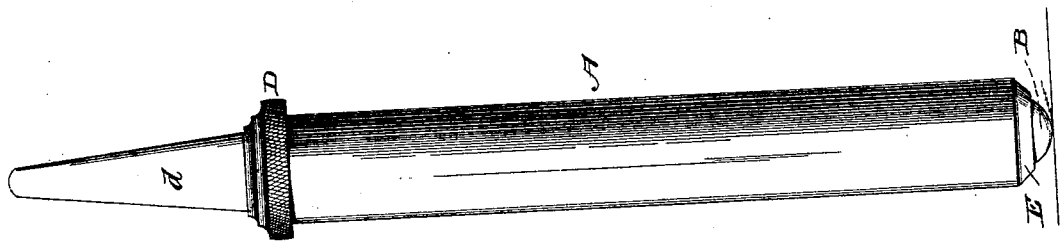

(No Model.)

A. W. ASKEW.
FOUNTAIN MARKING PEN.

No. 538,492.  Patented Apr. 30, 1895.

Witnesses.

Arthur W. Askew
Inventor
By Edson Bros.
Attys.

UNITED STATES PATENT OFFICE.

EDWARD D. KENDALL, OF SEWAREN, NEW JERSEY.

PROCESS OF AND REAGENT FOR RECOVERING SILVER AND GOLD FROM SOLUTIONS.

SPECIFICATION forming part of Letters Patent No. 538,522, dated April 30, 1895.

Application filed November 6, 1894. Serial No. 528,061. (No specimens.)

*To all whom it may concern:*

Be it known that I, EDWARD D. KENDALL, a citizen of the United States, residing at Sewaren, in the county of Middlesex and State of New Jersey, have invented certain new and useful Improvements for the Recovery of Gold and Silver from Solutions; and I do hereby declare the following to be a full and exact description thereof.

In this application, wherever I use the term zinc, I do not wish to be necessarily understood as meaning zinc from which all impurities have been removed, but I wish to be understood as referring also to commercial zinc, which is really a zinc alloy containing zinc in combination with a small percentage of various metals, such as antimony, arsenic and lead.

I do not confine myself to any particular solvent in making the solution of precious metals from the ore. Necessarily the precipitating agent must be such as to be chemically active in the presence of such solvent. It is applicable to all processes where a metallic precipitating agent is used, but as in the present state of the art, the solvent in general use is an aqueous solution of a cyanide, I will explain my process as applied to that method.

The cyanide solution charged with the precious metals has heretofore been subjected to various processes for the recovery of the gold and silver, and the object of my invention is to furnish a rapid, exhaustive and comparatively inexpensive process for the separation of the precious from the baser metals contained in the solution, and primarily involves the adaptation and use of a new and improved precipitating reagent and a new and improved method of treating the resulting precipitates.

Heretofore, in the so-called cyanide processes, the solution has been made to percolate through a precipitating agent of comminuted zinc, whereby the gold and silver, as well as the baser metals have been deposited together upon the zinc, but in these processes the after recovery of the gold and silver from the precipitate is tedious and only partially effective.

In my improved process I bring the charged solution into contact with a pulverized amalgam of zinc and mercury, hereinafter more fully described, either by agitation or percolation. As a result of the chemical and electrolytical reaction which takes place and which, may be, is somewhat hastened by heating the solution, the gold and silver are taken up by the mercury of the amalgam, an equivalent quantity of the zinc in the amalgam takes the place of those metals in the solution and of the baser metals which are separately precipitated. The valuable precipitate will then consist of gold and silver in the form of a mercurial amalgam and the excess of zinc amalgam. This excess must be always present, because it is impossible to predetermine exactly how much of the zinc amalgam the solution requires, and, therefore, to provide against all contingencies and to secure the certain amalgamation of all the gold and silver contained in the solution, it is practically necessary to supply the zinc amalgam in a quantity greater than the preliminary assay of the ore might indicate particularly, so as by the next step in my improved process the zinc is readily separated from the other constituent parts of the amalgam. This is accomplished by removing the valuable precipitate to another vessel, covering it with granulated carbon, the ordinary hard carbon, such as is used in electrical batteries answers the purpose very well, and then nearly filling the vessel with a solution of sulphuric acid and water in the proportion of about one part of acid to ten or twelve of water. This combination constitutes the elements of an electrical voltaic pair. Carbon in the presence of the amalgam and acid solution is chemically inert but electrically active. The electrolytic action which follows, causes the zinc to be rapidly oxidized, dissolved and taken up by the dilute acid. After the exhaustion of the zinc, the amalgam will then practically consist of gold, silver and mercury only, and the precious metals are recovered therefrom by the ordinary well known processes, such as by distilling off the mercury.

The zinc amalgam above referred to should, of course, be comminuted into granules, turnings, filings or shavings, but to obtain the best and most economical results it should be pulverized.

If metallic mercury should be added to zinc powder, there would immediately be formed a pasty, cohesive mass of amalgam, which would destroy the individuality of the separate particles of the zinc powder and thus materially and unfavorably affect the process. This cohesion of the particles may be prevented and their individuality retained in the form of an amalgamated powder by agitating the powdered zinc in a solution of salt of mercury, such as a nitrate or sulphate.

Another method of producing the powdered amalgam is to melt the zinc and while fluid, mix with it about one pound of metallic mercury to three of zinc and after thorough mixing, and cooling, grinding the amalgam thus formed, but I do not confine myself to any particular proportion or method of producing the powdered amalgam, the essential requirement being as applied to all processes that it shall be an amalgam of mercury with that metal which may be properly used as a precipitant for the particular solvent used in the original solution. As above stated, when the solvent is cyanogen, the precipitating agent is an amalgam of zinc and mercury, preferably in the form of powder or granules.

Having thus described my invention, what I claim, and desire to secure by Letters Patent, is—

1. In the recovery of gold and silver from cyanide solutions the process of subjecting said solutions to the action of a pulverized amalgam, composed of mercury and zinc as described.

2. In the recovery of gold and silver from solutions, the process of transferring the gold and silver from said solutions to a mercurial amalgam, by first subjecting them to the action of a pulverized or granulated amalgam, composed of mercury and an appropriate metallic reagent and then treating the valuable precipitate to the action of granulated carbon in contact therewith in a bath of dilute acid, substantially as described.

3. The process of the recovery of gold and silver from solutions which consists of the following steps, (first) the subjecting of the ore containing the precious metals to the action of a solvent, thus obtaining an aqueous solution of the solvent and the minerals contained in the ore, (second) subjecting the said solution to the electro-chemical action of a mercurial amalgam, (third) subjecting the valuable precipitate secured by the preceding process to the action of dilute acid in the presence of carbon, (fourth) the recovery of the valuable metal from the result of the preceding process, substantially as described.

EDWARD D. KENDALL.

In presence of—
JAMES W. HUGHES,
SAML. V. BILLINGS.